United States Patent
Chen

(10) Patent No.: US 11,131,391 B2
(45) Date of Patent: Sep. 28, 2021

(54) VALVE

(71) Applicant: OTRAJET INC., Taichung (TW)

(72) Inventor: Ching-Hao Chen, Taichung (TW)

(73) Assignee: OTRAJET INC., Taichung (TW)

( * ) Notice: Subject to any disclaimer, the term of this patent is extended or adjusted under 35 U.S.C. 154(b) by 88 days.

(21) Appl. No.: 16/516,101

(22) Filed: Jul. 18, 2019

(65) Prior Publication Data

US 2020/0072364 A1     Mar. 5, 2020

(30) Foreign Application Priority Data

Aug. 28, 2018 (TW) .................................. 107129970
Sep. 8, 2018 (TW) .................................. 107131644

(51) Int. Cl.
*F16K 3/32* (2006.01)
*F16K 1/36* (2006.01)
*B29C 45/18* (2006.01)
*F16K 31/122* (2006.01)
*F16K 11/22* (2006.01)
(Continued)

(52) U.S. Cl.
CPC ............ *F16K 1/36* (2013.01); *B29C 44/3449* (2013.01); *B29C 45/1816* (2013.01); *F16K 1/42* (2013.01); *F16K 3/32* (2013.01); *F16K 31/1221* (2013.01)

(58) Field of Classification Search
CPC .. Y10T 137/86928; B29C 45/231–234; B29C 2045/235–237; F16K 31/122; F16K 11/22; F16K 1/36–385; F16K 1/443
See application file for complete search history.

(56) References Cited

U.S. PATENT DOCUMENTS 3,398,435 A * 8/1968 Nouel ................... B29C 45/544
                                                        425/166
4,358,033 A * 11/1982 Dykehouse ........... B29C 44/425
                                                        222/413
(Continued)

FOREIGN PATENT DOCUMENTS

CN           205978641 U      2/2017
DE     102017213153 A1 * 1/2019 ............. F16K 41/12
WO    WO-2006108930 A1 * 10/2006 ............. F23N 1/005

*Primary Examiner* — Seth W. Mackay-Smith
(74) *Attorney, Agent, or Firm* — Guice Patents PLLC

(57) ABSTRACT

The invention provides a valve disposed in a fluid supply path to control opening or closing of the supply path, configured to comprise, as components of the supply path, an inflow channel, a second channel, a first channel, and an outflow channel that are in communication with each other in sequence, in such a manner that fluid from a supply source entering the inflow channel passes through the second channel and the first channel in sequence and then flows out through the outflow channel. The valve further comprises a first valve piece and a second valve piece disposed movably in the first channel and the second channel respectively. Blocking or unblocking of the communication between the first channel and the outflow channel is controlled by movement of the first valve piece in the first channel, while blocking or unblocking of the communication between the inflow channel and the first channel via the second channel is controlled by movement of the second valve in the second channel. In this way, the valve enables opening or closing of the supply path through dual control by the first valve piece and the second valve piece.

7 Claims, 11 Drawing Sheets

(51) Int. Cl.
*F16K 1/42* (2006.01)
*B29C 44/34* (2006.01)

(56) References Cited

U.S. PATENT DOCUMENTS

| | | | |
|---|---|---|---|
| 6,325,612 B1* | 12/2001 | Nakamura | B29C 45/231 |
| | | | 264/478 |
| 6,659,757 B2 | 12/2003 | Kim et al. | |
| 2011/0168284 A1* | 7/2011 | Whitford | F23L 11/005 |
| | | | 137/613 |
| 2013/0341425 A1* | 12/2013 | Peel | F16K 11/22 |
| | | | 239/132 |
| 2017/0097101 A1* | 4/2017 | Cheng | F16K 17/0473 |
| 2019/0032790 A1* | 1/2019 | Justl | F16K 1/443 |
| 2019/0234521 A1* | 8/2019 | Halbheer | F16K 27/0263 |

* cited by examiner

VALVE

BACKGROUND OF THE INVENTION

1. Field of the Invention

The invention relates to the technique of fluid supply, and more particularly to a valve applied in the technique of polymer molding and processing to provide control of opening and closing of a supply passageway for fluid such as supercritical fluid, color paste, or any other additive to flow therein.

2. Description of the Related Art

As described in U.S. Pat. No. 6,659,757, a problem exists in a conventional valve that the gap between the valve stem and the valve hole tends to cause deviation over time and consequently wears between various parts, which leads to failure of the valve itself. In order to overcome this problem, a design of multiple gaskets was disclosed to ensure the coaxial correspondence between the valve stem and the valve hole, so as to prevent one part from wearing with respect to other parts due to its deviation in position. Although such a technique can achieve its object, this technical solution of multiple gaskets does not provide a perfect design.

SUMMARY OF THE INVENTION

In view of this, it is a main object of the invention to provide a valve that can control closing and opening of a fluid supply passageway.

Therefore, to achieve this object, the invention provides a valve disposed in a fluid supply path to control opening or closing of the supply path, configured to comprise, as components of the supply path, an inflow channel, a second channel, a first channel, and an outflow channel that are in communication with each other in sequence, in such a manner that fluid from a supply source entering the inflow channel passes through the second channel and the first channel in sequence and then flows out through the outflow channel. The valve further comprises a first valve piece and a second valve piece disposed movably in the first channel and the second channel respectively. Blocking or unblocking of the communication between the first channel and the outflow channel is controlled by movement of the first valve piece in the first channel, while blocking or unblocking of the communication between the inflow channel and the first channel via the second channel is controlled by movement of the second valve in the second channel. In this way, the valve enables opening or closing of the supply path through dual control by the first valve piece and the second valve piece.

The valve further comprises a seat in which the inflow channel, the first channel, the second channel, and the outflow channel are disposed, and the first valve piece and the second valve piece are disposed slidably.

Further, the first valve piece further comprises a first valve stem that is disposed slidably in the first channel and can move axially back and forth along its stem axis between a first closed position and a first opened position. The second valve piece further comprises a second valve stem that is disposed slidably in the second channel and can move axially back and forth along its stem axis between a second closed position and a second opened position. In this way, when the first valve stem is in the first opened position and the second valve stem is in the second opened position, the portion of the supply path consisting of the inflow channel, the second channel, the first channel, and the outflow channel is unblocked, whereas when the first valve stem is in the first closed position and the second valve stem is in the second closed position, this portion of the supply path is blocked to stop flowing of the fluid.

The first valve stem is segmented in sequence along its stem axis into a main shaft segment positioned in the first channel, an extended segment extended and positioned in the outflow channel, and an annular tapered face between the main shaft segment and the extended segment. The outflow channel has a tapered-segment inner wall face opposite to that tapered face and of the same slope as it. In this way, the first valve stem, when in the first closed position, causes the tapered face to be opposite to and in close contact with the tapered-segment inner wall face, so as to block the communication between the outflow channel and the first channel.

The second channel has a main body segment through which the second valve stem passes and disposed slidably and which is in communication with the inflow channel, and a connection segment of an inner diameter smaller than that of the main body segment for connecting the main body segment to the first channel. The second valve stem has cone-ended segment in a tapered shape on its end, and the end of the cone-ended segment extends from the main body segment into the connection segment. When the second valve stem is in the second closed position, a tapered bezel at the circumferential side of the cone-ended segment is pressed against the opening in the connection segment connected to the main body segment to block the communication between the main body segment and the connection segment.

DETAILED DESCRIPTION OF THE PREFERRED EMBODIMENTS

Figure 1:
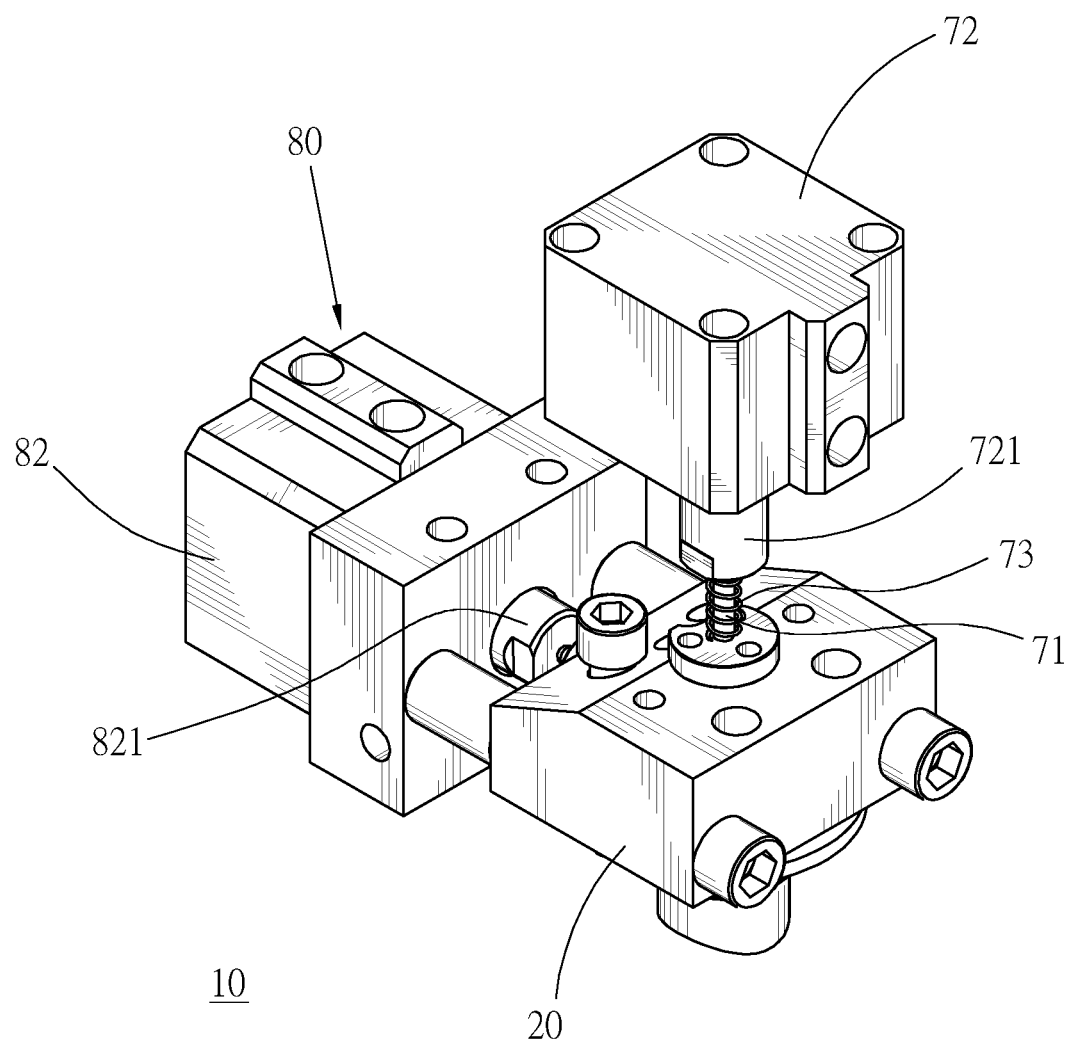
FIG. 1 is a three-dimensional view of a preferred embodiment of the invention.
Figure 2:
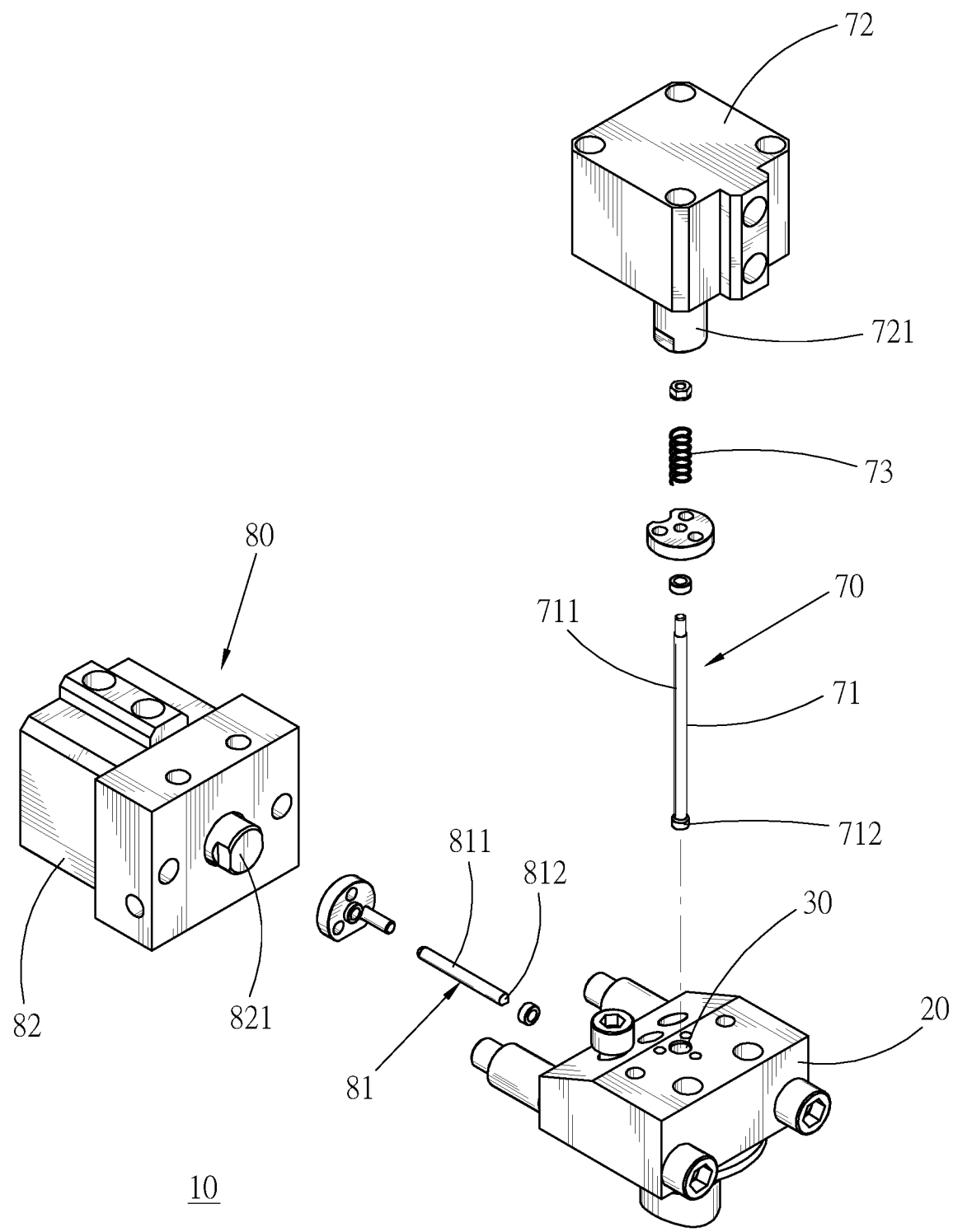
FIG. 2 is an exploded view of a first preferred embodiment of the invention.

First, with reference to FIGS. 1 and 2, a valve (10) according to a preferred embodiment of the invention comprises essentially a seat (20), a first channel (30), a second channel (40), an inflow channel (50), an outflow channel (60), a first valve piece (70), and a second valve piece (80).

Figure 3:
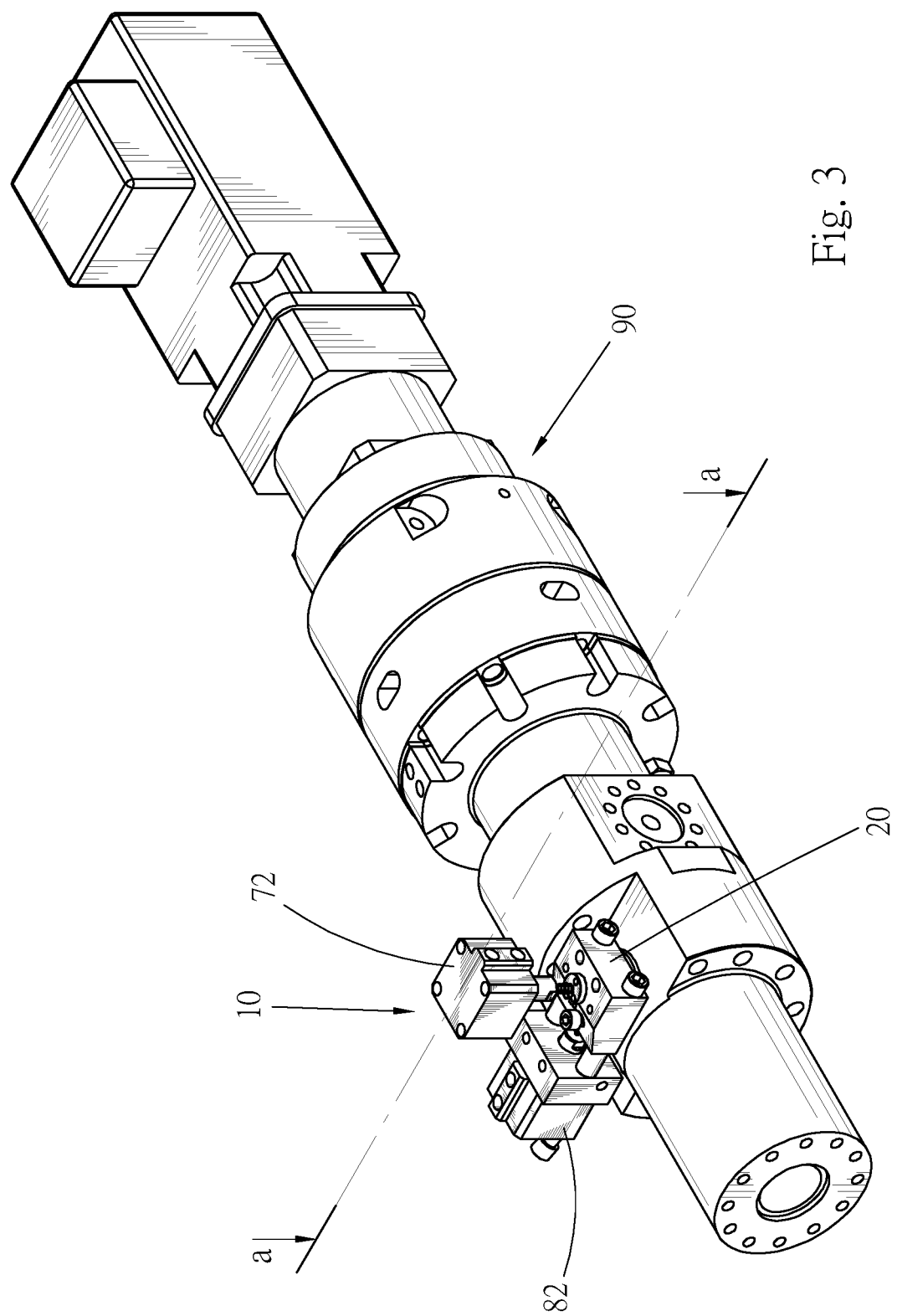
FIG. 3 is a three-dimensional view of the first preferred embodiment of the invent ion applied to a polymer injection machine.

The seat (20) is a block having a shape and configuration that can be assembled and joined to other elements and a strength that can withstand the high pressure of the fluid. The seat (20) is joined to an extrusion barrel or a mixing barrel of a polymer injection machine (90) shown in FIG. 3 and serves as part of a supply path for external fluid to be supplied into the extrusion barrel or the mixing barrel and mixed with the polymer material, and also as a base on which other constituent elements of the valve (10) are provided. In the technique of polymer molding and processing, the so-called external fluid is, for example, super-critical fluid, color Masterbatch, color paste, or any other additive in the state of fluid.

The first channel (30) and the outflow channel (60) are straight holes passing through the seat (20) in coaxial communication with each other. Specifically, the outflow channel (60) has an outflow segment (61) extending inwardly from the end face of an underside of the seat (20) to a suitable depth. A tapered segment (62) in the shape of a cone-shaped hole is positioned inside the seat (20) and connects the outflow segment (61) to the first channel (30). The inner diameter of the outflow segment (61) is larger than that of the first channel (30), so that the inner wall face (621) of the tapered segment (62) faces the outflow segment (61).

The second channel (40) is a straight hole that extends inwardly from the left end face of the seat (20) and is in communication with and perpendicular to a middle portion of the first channel (30). Further, the second channel (40) is segmented in sequence along the hole axis into a main body segment (41) in communication with the outside on the left end face of the seat (20), a connection segment (42) of an inner diameter smaller than that of the main body segment (41) and connecting the main body segment (41) to the first channel (30), and a shoulder face (43) between the main body segment (41) and the connection segment (42).

The inflow channel (50) extends from the top end of the seat (20) downwardly and obliquely to a location on the main body segment (41) close to the shoulder face (43).

The first valve piece (70) has a first valve stem (71) in the shape of a straight bar that passes coaxially through the first channel (30) and the outflow channel (60). Its top end extends above the seat (20) and its bottom end is positioned in the outflow channel (60). A first hydraulic cylinder (72) has an output shaft (721) pressed against the top end of the first valve stem (71). A compression spring (73) is sleeved over the portion of the first valve stem (71) that extends out of the seat (20), and provides an elastic force for the first valve stem (71) to move upwardly.

Further, the first valve stem (71) is segmented along its stem axis into a main shaft segment (711) disposed slidably in the first channel (30), an extended segment (712) extending into the outflow channel (60), and an annular tapered face (713) between the main shaft segment (711) and the extended segment (712). The tapered face (713) is opposite to the inner wall face (621) of the tapered segment (62) and has the same tapering slope as it. The main shaft segment (711) has an outer diameter smaller than the inner diameter of the first channel (30), and the extended segment (712) has an outer diameter smaller than the inner diameter of the outflow segment (61).

The second valve piece (80) has a second valve stem (81) in the shape of a straight bar that passes slidably and coaxially through the main body segment (41) of the second channel (40) with its left end extending out of the left end face of the seat (20). A second hydraulic cylinder (82) has an output shaft (821) pressed against the left end of the second valve stem (81).

Still further, the second valve stem (81) is segmented in sequence along its stem axis into a shaft body segment (811) disposed slidably in the second channel (40) and a cone-ended segment (812) is a tapered shape between the shaft body segment (811) and the connection segment (42).

In addition, the specific configuration and arrangement or coupling with other elements and the like of the first hydraulic cylinder (72) and the second hydraulic cylinder (82) are well known in the art. They are illustrated merely as the power source for actuation of the valve in the present embodiment. Therefore, although some parts are not fully depicted in the figures, they will not affect implementation of the invention by those of ordinary skills in the art.

Figure 4:
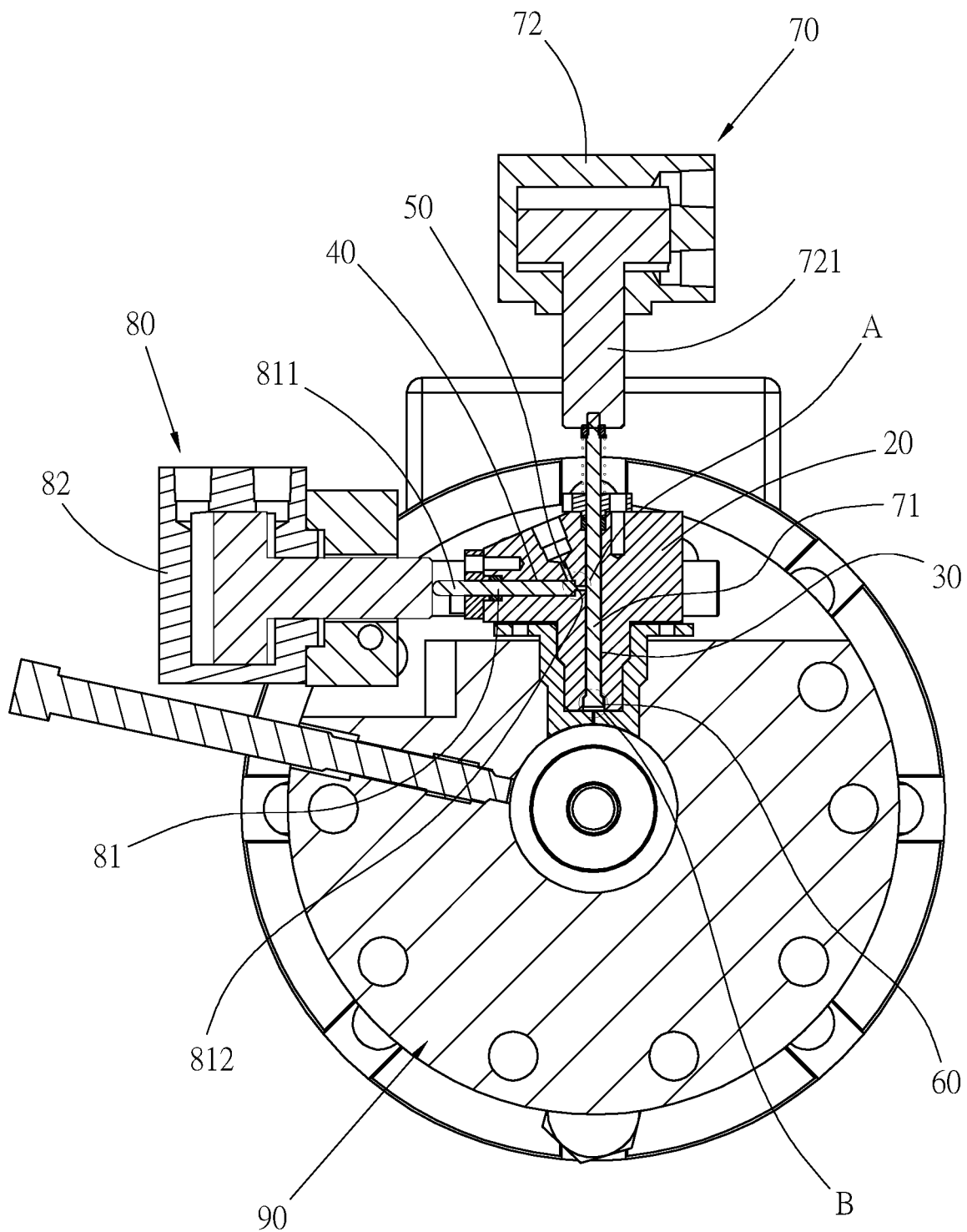
FIG. 4 is a sectional view of the first preferred embodiment of the invention taken along the sectional line a-a in FIG. 3, in which the first valve stem and the second valve stem are respectively in a closed position.
Figure 5:
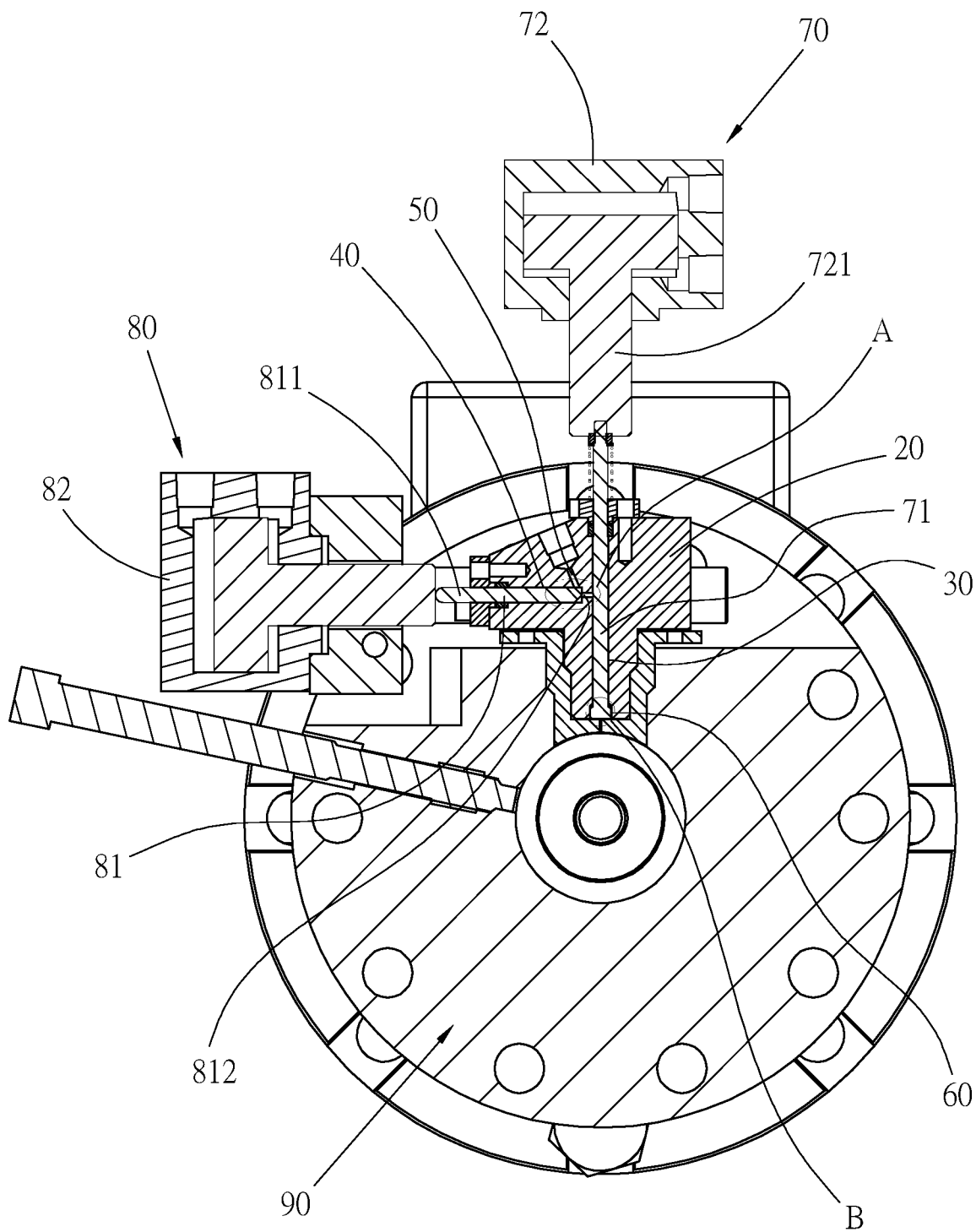
FIG. 5 is a sectional view of the first preferred embodiment of the invention taken along the sectional line a-a in FIG. 3, in which the first valve stem and the second valve stem are respectively in an opened position.

With the configuration of the members described above, the first valve stem (71) can be moved back and forth axially in the first channel (30) and the outflow channel (60) along its stem axis between a first closed position and a first opened position. The second valve stem (81) can be moved back and forth axially in the second channel (40) along its stem axis between a second closed position and a second opened position. Generally, when the first valve stem (71) is in the first closed position and the second valve stem (81) is in the second closed position, the communication between the inflow channel (50) and the first channel (30) as well as the communication between the first channel (30) and the outflow segment (61) are blocked as shown in FIG. 4. On the contrary, when the first valve stem (71) is in the first opened position and the second valve stem (81) is in the second opened position, the whole passageway, from the inflow channel (50), through the second channel (40) and the first channel (30) in sequence, to the outflow channel (60), is unblocked as shown in FIG. 5. In this way, the valve (10) can control flow of the fluid, so as to control the amount of fluid entering the extrusion barrel or the mixing barrel of the polymer injection machine (90) to be mixed with the polymer material.

Figure 5A:
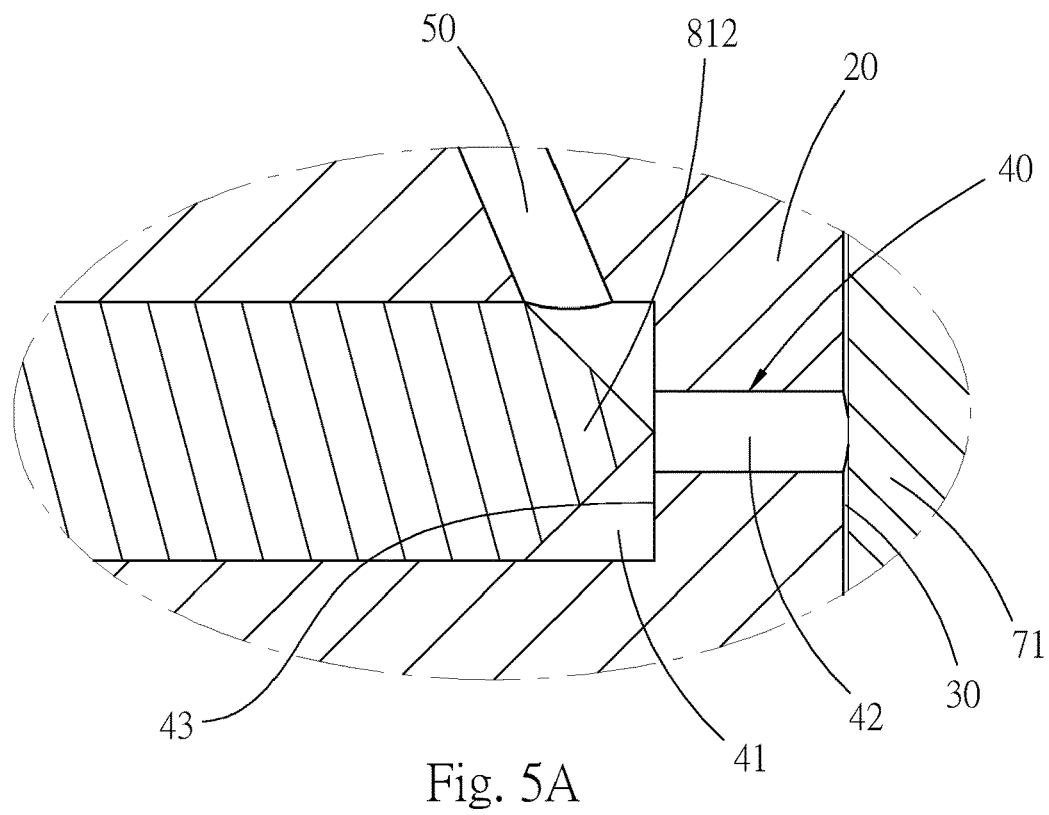
FIG. 5(A) is a partial enlarged view showing the area A in FIG. 5.
Figure 5B:
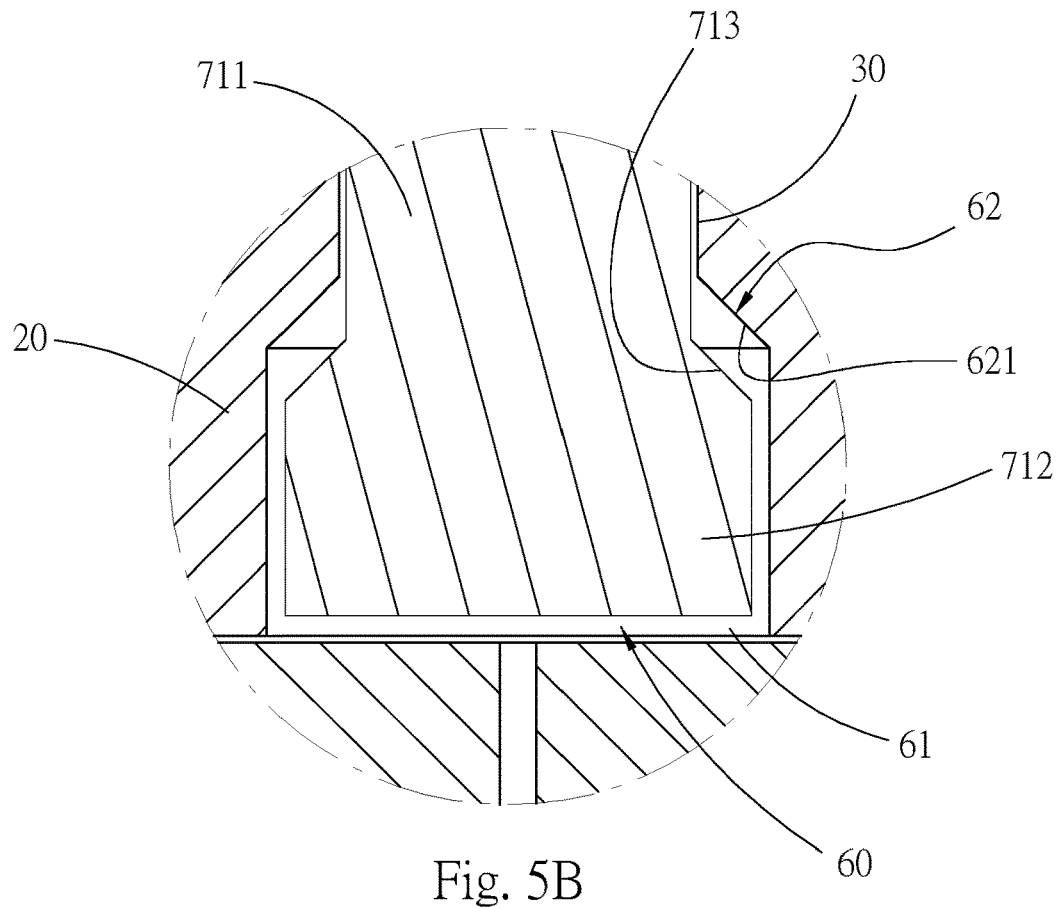
FIG. 5(B) is a partial enlarged view showing the area B in FIG. 5.

With reference to FIGS. 5, 5(A), and 5(B), as for the axial movement of the first valve stem (71), the elastic force of the compression spring (73) maintains the first valve stem (71) elastically in the first closed position. As shown in FIG. 4, when the first valve stem (71) is in the first closed position, the tapered face (713) is in close contact with the inner wall face (621), thereby blocking the communication between the outflow segment (61) and the first channel (30). On the contrary, when power is supplied from the first hydraulic cylinder (72) to push the first valve stem (71) downward via the output shaft (721) so as to cause the first valve stem (71) to move axially to the first opened position as shown in FIG. 5, the tapered face (713) and the inner wall face (621) are separated from each other. Also, since the outer diameter of the main shaft segment (711) is smaller than that of the first channel (30) and the outer diameter of the extended segment (712) is smaller than that of the outflow segment (61), such a difference in size provides a gap therebetween for the fluid to flow therein.

Figure 4A:
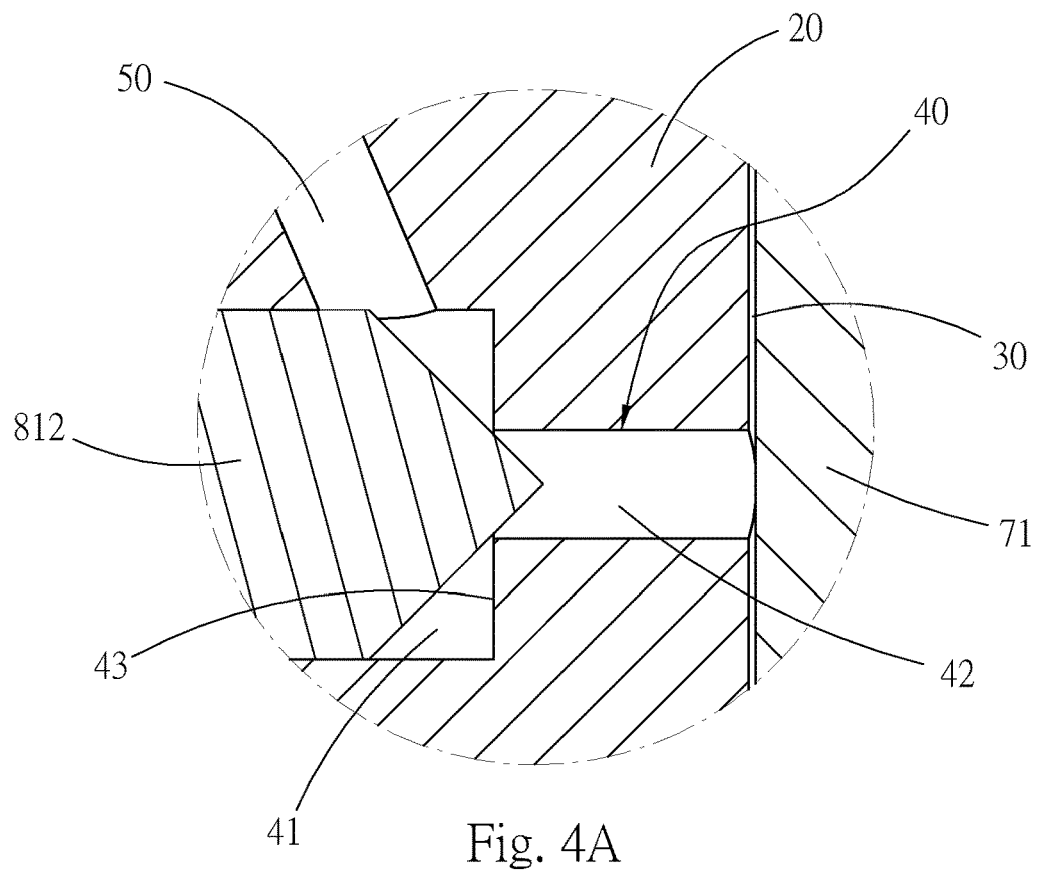
FIG. 4(A) is a partial enlarged view showing the area A in FIG. 4.
Figure 4B:
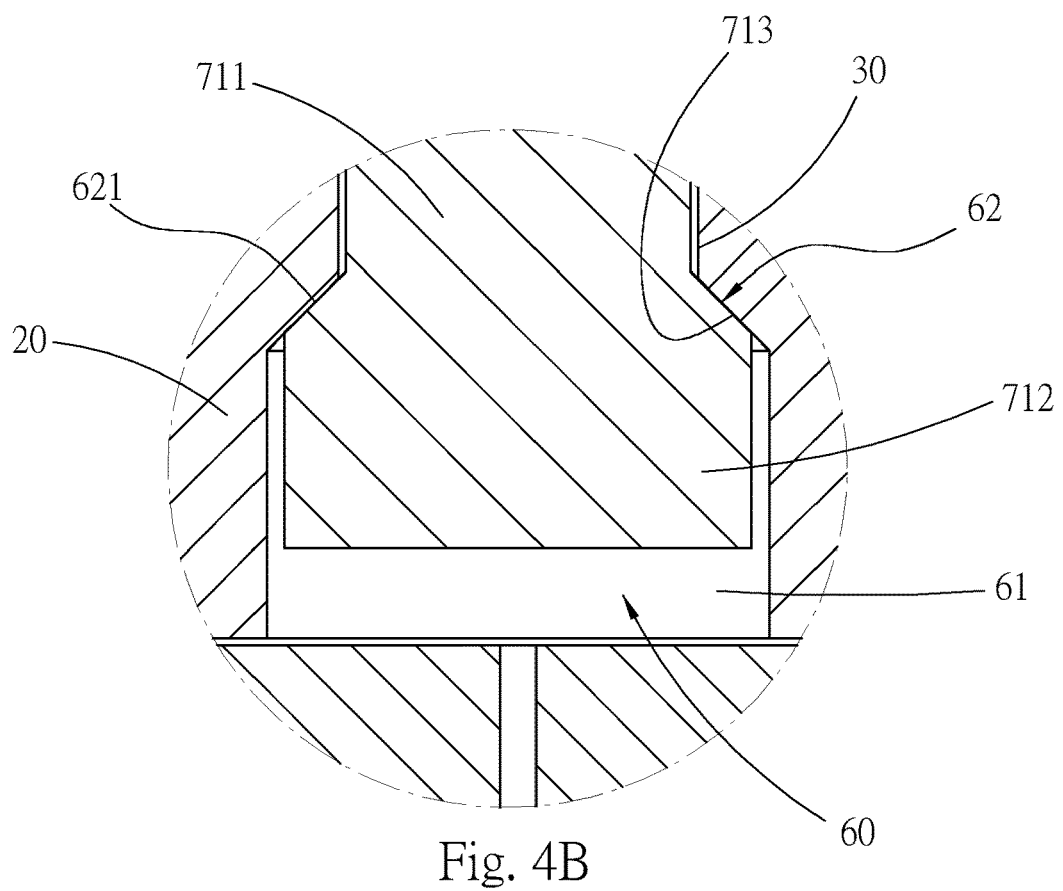
FIG. 4(B) is a partial enlarged view showing the area B in FIG. 4.

Still further, with reference to FIGS. 4, 4(A), and 4(B), as for the axial movement of the second valve stem (81), an external force from the second hydraulic cylinder (82) pushes the second valve stem (81) to the right till the second closed position as shown in FIG. 4. At this point, the end of the cone-ended segment (812) extends from the main body segment (41) into the connection segment (42), with the tapered face at the circumferential side being pressed against the opening in the connection segment (42) connected to the main body segment (41), thereby blocking the communication between the main body segment (41) and the connection segment (42). Meanwhile, a space (s) between the circumferential side of the cone-ended segment (812) and the inner wall face of the main body segment (41) remains in communication with the inflow channel (50), thereby allowing the space (s) to be filled with the fluid that is still in communication with an external fluid supply via the inflow channel (50). In other words, in this space (s), high pressure of the fluid acts continuously on the circumferential side face of the cone-ended segment (812). Therefore, once the external force applied by the second hydraulic cylinder (82) is released, the pressure of the fluid in the space (s) pushes the second valve stem (81) to the left till the second opened position as shown in FIG. 5, thereby allowing the inflow channel (50) to be in communication indirectly with the first channel (30) via the second channel (40).

Figure 6:
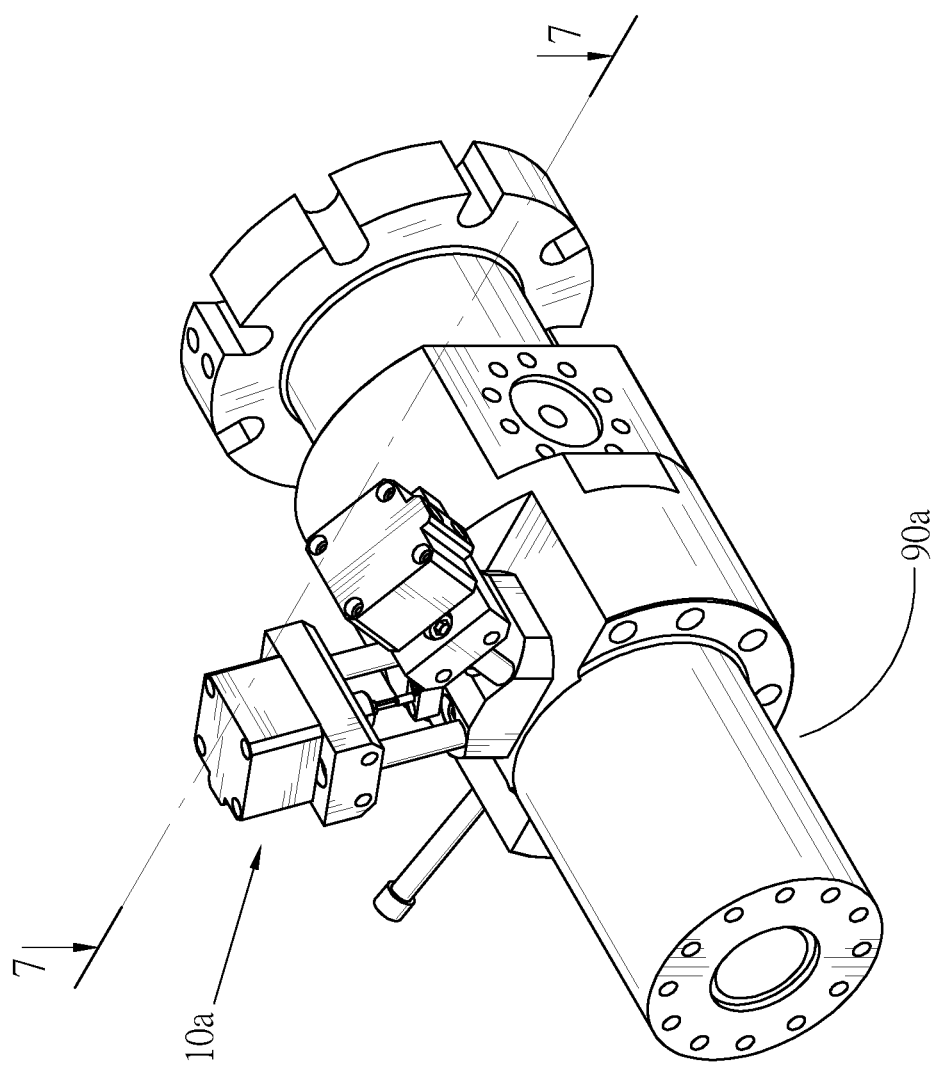
FIG. 6 is a three-dimensional view of a second preferred embodiment of the invention.
Figure 7:
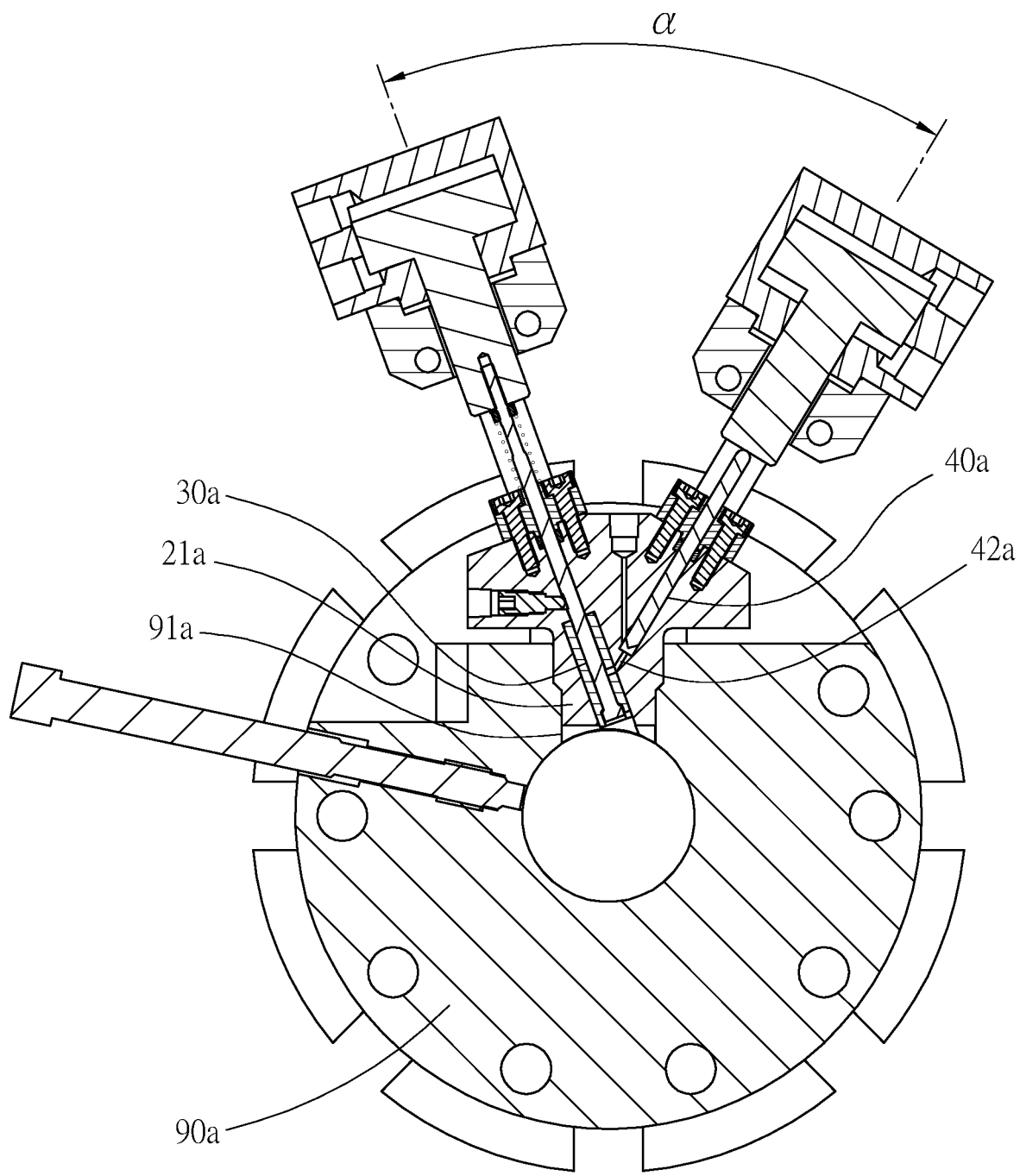
FIG. 7 is a sectional view of the second preferred embodiment of the invention taken along the sectional line 7-7 in FIG. 6.

Further, with reference to FIGS. 6 and 7, the valve (10a) according to the second preferred embodiment of the invention has the same essential technical characteristics as the one disclosed in the first preferred embodiment described above, but has better efficacy than the first preferred embodiment in maintaining the temperature of the fluid.

Specifically, as disclosed in this embodiment, the second channel (40a) and the first channel (30a) are in communication with each other with an acute included angle (α) therebetween, so that the connection segment (42a) is positioned closer to the center of the extrusion barrel or the mixing barrel of the polymer injection machine (90a). In this way, heat generated during operation of the extrusion barrel or the mixing barrel of the polymer injection machine (90a) can be utilized to maintain the temperature of the fluid, thereby reducing temperature loss of the fluid.

Figure 8:
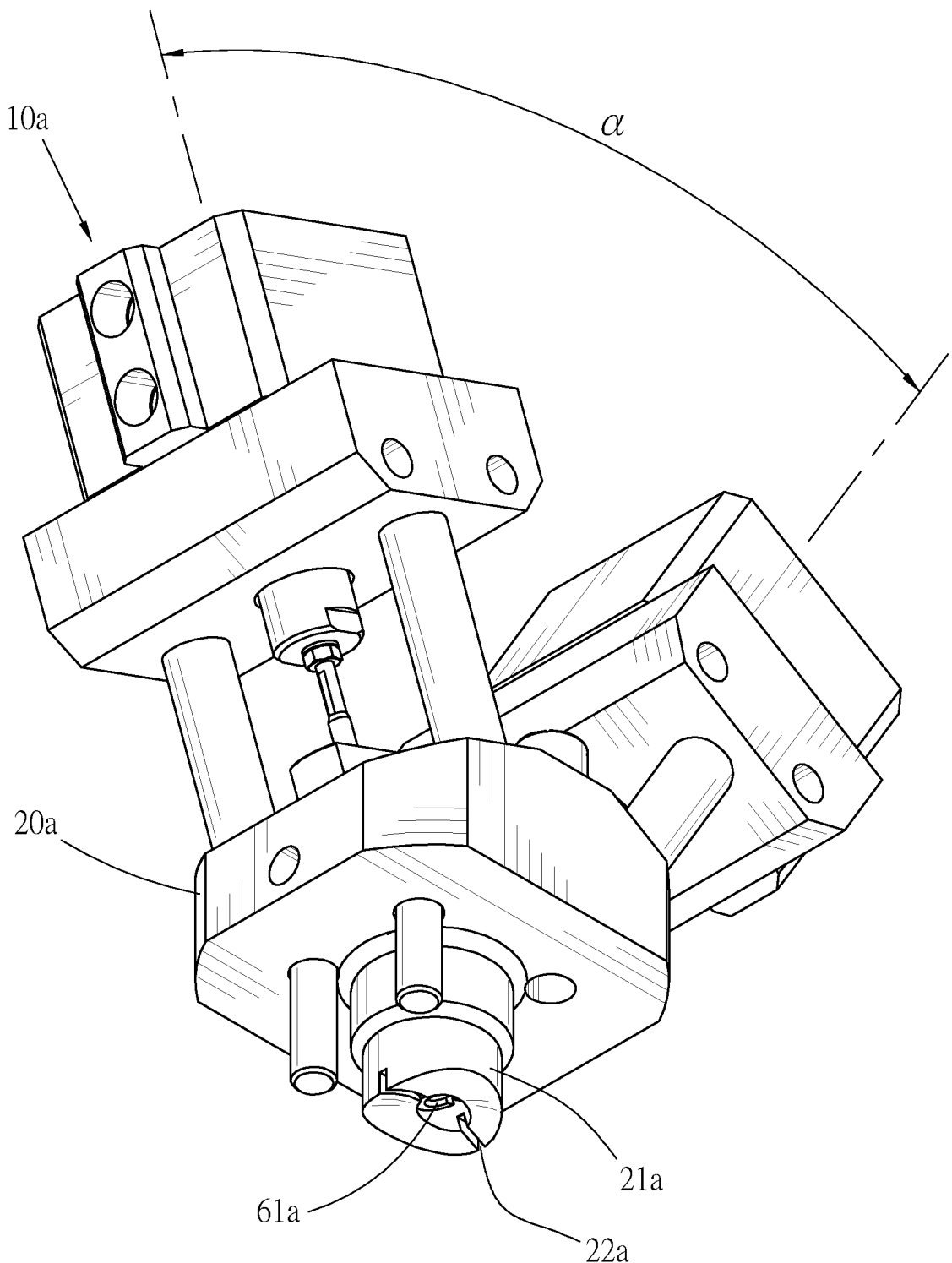
FIG. 8 is a three-dimensional bottom view of the second preferred embodiment of the invention.
Figure 9:
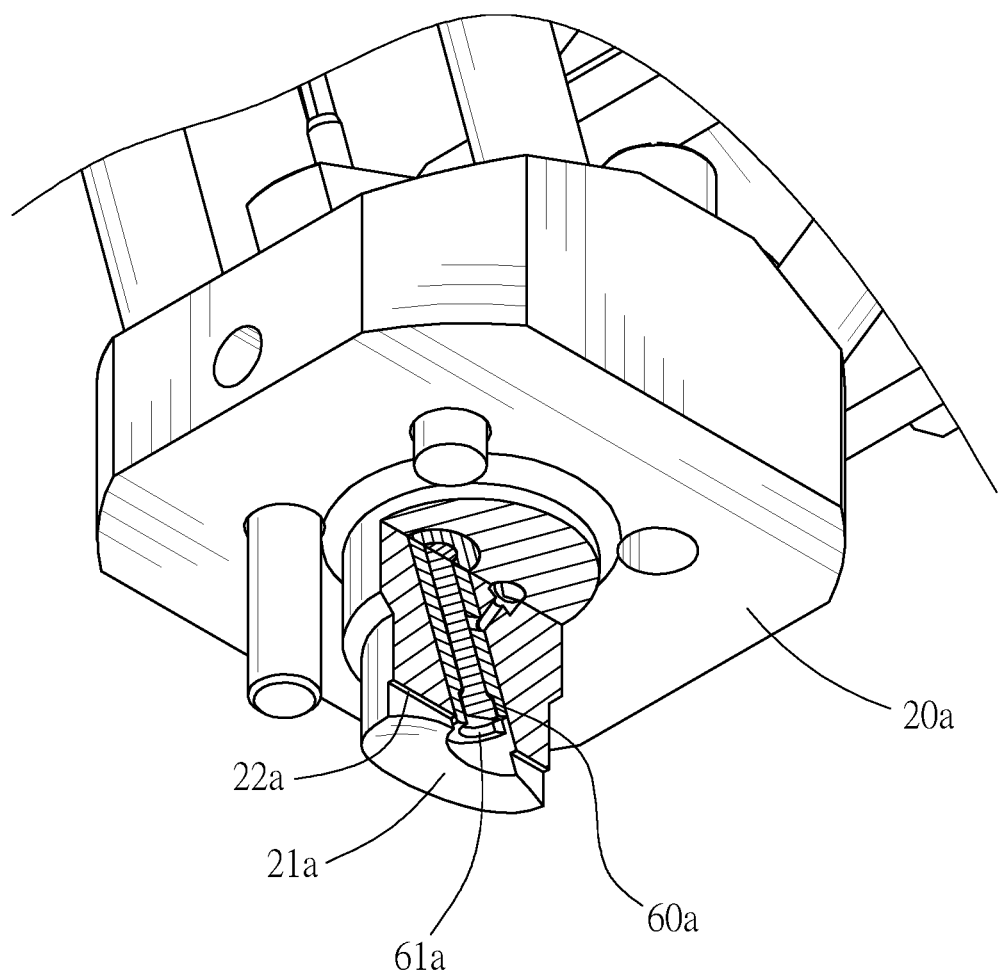
FIG. 9 is a three-dimensional bottom view showing a partial section of the second preferred embodiment of the invention.

In order to further maintain the temperature of the fluid, and with reference to FIGS. 8 and 9, in this embodiment, an approximately V-shaped connection is made between the second channel (40a) and the first channel (30a) to allow the portions of the channels connected to be positioned inside an insertion pillar (21a) protruding from the bottom end of the seat (20a). As such, once the insertion pillar (21a) of the seat (20a) is inserted into an insertion hole (91a) in the extrusion barrel or mixing barrel of the polymer injection machine (90a) and the seat (20a) is thus joined to the extrusion barrel or mixing barrel of the polymer injection machine (90a), the portions of the channels connected are covered by the extrusion barrel or mixing barrel of the polymer injection machine (90a), thereby avoiding temperature loss due to contact with the surroundings.

In addition, in this embodiment, the outflow segment (61a) of the outflow channel (60a) is further in communication with an undercut (22a) provided at the end of the insertion pillar (21a), so that the fluid flowing out via the outflow segment (61a) is dispersed via the undercut (22a) and then fed evenly into the extrusion barrel or mixing barrel of the polymer injection machine (90a) and mixed with the raw material.

REFERENCE NUMBERS (10)(10a) valve
(20)(20a) seat
(21a) insertion pillar
(22a) undercut
(30) first channel
(40) second channel
(41) main body segment
(42) connection segment
(43) shoulder face
(50) inflow channel
(60)(60a) outflow channel
(61)(61a) outflow segment
(62) tapered segment
(621) inner wall face
(70) first valve piece
(71) first valve stem
(711) main shaft segment
(712) extended segment
(713) tapered face
(72) first hydraulic cylinder
(721) output shaft
(73) compression spring
(80) second valve piece
(81) second valve stem
(811) shaft body segment
(812) cone-ended segment
(82) second hydraulic cylinder
(821) output shaft
(90)(90a) injection machine
(91a) insertion hole
(α) included angle

What is claimed is:

1. A valve positioned in a fluid supply path to control opening and closing of the supply path, comprising:
   a seat;
   a first channel disposed in the seat;
   a second channel disposed in the seat and in communication with the first channel;
   an inflow channel disposed in the seat and in communication with the second channel, and also in communication indirectly with the first channel via the second channel;
   an outflow channel disposed in the seat and in communication with the first channel, and also in communication indirectly with the inflow channel via the first channel and the second channel;
   a first valve piece disposed movably in the first channel that can be moved between a first closed position and a first opened position, in which when the first valve piece is in the first closed position, the communication between the first channel and the outflow channel is blocked, whereas when the first valve piece is in the first opened position, the first channel and the outflow channel are put in communication with each other;
   a second valve piece disposed movably in the second channel that can be moved between a second closed position and a second opened position, in which when the second valve piece is in the second closed position, the communication between the inflow channel and the first channel is blocked, whereas when the second valve piece is in the second opened position, the first channel and the inflow channel are put in communication with each other;
   wherein the first channel, the second channel, and the outflow channel are straight holes, the first channel is in communication with and perpendicular to the second channel;

wherein the first valve piece has a first valve stem in the shape of a straight bar that passes coaxially through the first channel and the outflow channel;

wherein the second channel has a main body segment and a connection segment connecting the main body segment to the first channel, the connection segment having an inner diameter smaller than an inner diameter of the main body segment so as to form an opening in communication with the main body segment;

wherein the inflow channel is connected to the main body segment at a position adjacent to the connection segment;

wherein the second valve piece has a second valve stem disposed slidably in the main body segment that can be moved axially back and forth along its stem axis between the second closed position and the second opened position;

wherein the second valve stem is segmented in sequence along its stem axis into a shaft body segment positioned in the main body segment and a cone-ended segment in a tapered shape, an end of the cone-ended segment capable of being extended into the connection segment;

wherein, when the second valve stem is in the second closed position, the end of the cone-ended segment is positioned in the connection segment, while a tapered bevel at the circumferential side of the cone-ended segment is pressed against the opening in the connection segment, so as to block the communication between the connection segment and the main body segment; and wherein, when the second valve stem is in the second opened position, the tapered bevel at the circumferential side of the cone-ended segment is separated from the opening in the connection segment, so as to put the main body segment and the connection segment in communication with each other.

2. The valve of claim 1, wherein the first valve stem is disposed slidably in the first channel and can be moved axially back and forth along its stem axis between the first closed position and the first opened position.

3. The valve of claim 2, wherein the first valve stem is segmented in sequence along its stem axis into a main shaft segment positioned in the first channel, an extended segment positioned in the outflow channel, and an annular tapered face between the main shaft segment and the extended segment.

4. The valve of claim 3, wherein:
the outflow channel has an outflow segment of an inner diameter larger than an inner diameter of the first channel and an outer diameter of the extended segment and a tapered segment connecting the outflow segment to the first channel, an inner wall face of the tapered segment having the same tapering slope as the annular tapered face; and
when the first valve stem is in the first closed position, the annular tapered face is in close contact with the inner wall face of the tapered segment to block the tapered segment, whereas when the first valve stem is in the first opened position, the annular tapered face is separated from the inner wall face of the tapered segment.

5. The valve of claim 4, wherein the first channel and the outflow channel pass through the seat in coaxial communication with each other.

6. The valve of claim 1, wherein when the second valve stem is in the second closed position, a space between an inner side wall face of the main body segment and the tapered bevel at the circumferential side of the cone-ended segment is in communication with the inflow channel.

7. The valve of claim 1, wherein the first channel and the second channel are in communication with each other and separated by an acute included angle.

* * * * *